(12) United States Patent
Yang et al.

(10) Patent No.: US 12,215,771 B2
(45) Date of Patent: Feb. 4, 2025

(54) HARMONIC REDUCER WITH CONJUGATE CYCLOIDAL PROFILES

(71) Applicant: TIANJIN UNIVERSITY, Tianjin (CN)

(72) Inventors: Yuhu Yang, Tianjin (CN); Ran Xie, Tianjin (CN); Guocheng Zhou, Tianjin (CN); Zhaoguang Shen, Tianjin (CN)

(73) Assignee: TIANJIN UNIVERSITY, Tianjin (CN)

( * ) Notice: Subject to any disclaimer, the term of this patent is extended or adjusted under 35 U.S.C. 154(b) by 0 days.

(21) Appl. No.: 18/682,817

(22) PCT Filed: Apr. 26, 2022

(86) PCT No.: PCT/CN2022/089224
§ 371 (c)(1),
(2) Date: Feb. 9, 2024

(87) PCT Pub. No.: WO2023/015948
PCT Pub. Date: Feb. 16, 2023

(65) Prior Publication Data
US 2024/0352996 A1  Oct. 24, 2024

(30) Foreign Application Priority Data
Aug. 13, 2021 (CN) .......................... 20211092247.1

(51) Int. Cl.
*F16H 49/00* (2006.01)
*F16H 55/08* (2006.01)

(52) U.S. Cl.
CPC ....... *F16H 49/001* (2013.01); *F16H 55/0833* (2013.01); *F16H 2049/003* (2013.01)

(58) Field of Classification Search
CPC ............... F16H 49/001; F16H 55/0833; F16H 2049/003

(Continued)

(56) References Cited

U.S. PATENT DOCUMENTS

| 6,799,489 B2 * | 10/2004 | Ishikawa ............. F16H 55/0833 74/462 |
| 2007/0022838 A1 * | 2/2007 | Ishikawa ............. F16H 55/0833 74/640 |

(Continued)

FOREIGN PATENT DOCUMENTS

| CN | 101135357 A | 3/2008 |
| CN | 104074948 A | 10/2014 |

(Continued)

OTHER PUBLICATIONS

International Search Report of PCT/CN2022/089224.
Written Opinion of PCT/CN2022/089224.

*Primary Examiner* — Ha Dinh Ho

(57) ABSTRACT

The present disclosure discloses a harmonic reducer with conjugate cycloidal profiles, including a circular spline, a flexspline, a wave generator and a flexible bearing. A profile of the circular spline and a profile of the flexspline are conjugate cycloidal profiles. The profile of the circular spline and the profile of the flexspline are formed by hypocycloids and epicycloids formed by two rolling circles around a pitch circle of the circular spline and a pitch circle of the flexspline under an engaging state respectively. A sum of radii of the first rolling circle and the second rolling circle is equal to a difference between radii of the pitch circle of the circular spline and the pitch circle of the flexspline under the engaging state. The wave generator is a biarc cam wave generator, a cam curve is an arc within an angle of contact in the long axis direction.

4 Claims, 4 Drawing Sheets

(58) Field of Classification Search
USPC .......................................................... 74/640
See application file for complete search history.

(56) References Cited

U.S. PATENT DOCUMENTS

| | | | |
|---|---|---|---|
| 2007/0266819 A1* | 11/2007 | Ishikawa | F16H 55/0833 475/180 |
| 2008/0060466 A1* | 3/2008 | Ishikawa | F16H 55/0833 74/457 |
| 2016/0003338 A1* | 1/2016 | Ishikawa | F16H 49/001 74/640 |

FOREIGN PATENT DOCUMENTS

| | | |
|---|---|---|
| CN | 110020509 A | 7/2019 |
| CN | 112664638 A | 4/2021 |
| CN | 113446377 A | 9/2021 |

\* cited by examiner

HARMONIC REDUCER WITH CONJUGATE CYCLOIDAL PROFILES

CROSS-REFERENCE TO RELATED APPLICATIONS

This application is a national stage application of PCT/CN2022/089224. This application claims priorities from PCT Application No. PCT/CN2022/089224, filed Apr. 26, 2022, and from the Chinese patent application 2021109292471 filed Aug. 13, 2021, the content of which are incorporated herein in the entirety by reference.

TECHNICAL FIELD

The present disclosure relates to the field of planetary transmission, in particular to the field of harmonic gear transmission, in particular to a harmonic reducer with conjugate cycloidal profiles.

BACKGROUND ART

In recent years, with the development of production and the progress of science and technology, high requirements have been put forward for reducers in the fields such as aerospace, national defense, medical treatment, robotics and precision numerically-controlled machine tools. Especially, more performance requirements such as high load, high precision and high efficiency are often put forward for precision reducers applied in special fields such as national defense and weapons.

At present, planetary gear transmission have been widely applied in engineering. Harmonic gear transmission has become the first choice for engineering applications due to their outstanding advantages such as high gear ratio and compact structure. In harmonic gear transmission, complex elastic deformation of flexsplines is generated with the shape of wave generators, such that design of novel profiles in the field of harmonic transmission becomes a research hotspot. Involute tooth is most widely applied in rigid transmission due to their advantages such as easy machining. However, most teeth are in a cuspidal engaging state due to deformation of flexsplines in harmonic gear transmission. A biarc common tangent tooth is formed by two arcs and a straight line tangent thereto, which relieves the problem of too fewer engaged teeth under an unloaded state, and meanwhile greatly increases the number of teeth participating in engaging, so as to be widely applied in harmonic gear transmission.

However, the research of these profiles is to design tooth forms of the flexsplines before deformation, calculate complex tooth forms of circular splines through an engagement equation, and then approximate and fit them with simple curves, so as to meet machining requirements. This method will lead to the difference between engaging states of actually-machined profiles and theoretical analysis results, thereby reducing performance of the profiles; and parameters of the profiles are hardly adjusted according to the performance.

SUMMARY

In view of the defects or shortcomings mentioned above, the present disclosure provides a harmonic reducer with conjugate cycloidal profiles, which has high load and superior performance.

In order to solve the above technical problems, the present disclosure provides a harmonic reducer with conjugate cycloidal profiles, including a circular spline, a flexspline, a wave generator and a flexible bearing; the flexible bearing is installed between the wave generator and the flexspline; a profile of the circular spline and a profile of the flexspline under an engaging state are conjugate cycloidal profiles, which are composed of tooth addendum profiles and tooth dedendum profiles respectively; the tooth addendum profile of the circular spline is a hypocycloid formed by a first rolling circle pure rolling around a pitch circle of the circular spline, and the tooth dedendum profile of the circular spline is an epicycloid formed by a second rolling circle pure rolling around the pitch circle of the circular spline; the tooth dedendum profile of the flexspline is a hypocycloid formed by the first rolling circle pure rolling around a pitch circle of the flexspline under the engaging state, and the tooth addendum profile of the flexspline is an epicycloid formed by the second rolling circle pure rolling around the pitch circle of the flexspline under the engaging state; a sum of radii of the first rolling circle and the second rolling circle is equal to a difference between radii of the pitch circle of the circular spline and the pitch circle of the flexspline under the engaging state, so as to achieve complete conjugation of the profile of the circular spline and the profile of the flexspline, increase the number of paired teeth with conjugate engagement, and improve bearing capacity; and the wave generator is a biarc cam wave generator, and a cam curve of the biarc cam wave generator is an arc within an angle of contact in the long axis direction of the wave generator.

Furthermore, in the harmonic reducer with the conjugate cycloidal profiles according to the present disclosure, wherein, the wave generator and the flexible bearing are arranged in the flexspline, and the flexspline deforms under the action of arc curves of the wave generator; and within the angle of contact in the long axis direction of the wave generator, teeth of the flexspline are distributed on the pitch circle of the flexspline under the engaging state and engaged with teeth of the circular spline, and normal lines at any engaging points within the angle of contact in the long axis direction intersect at a pitch point.

Trajectories of the pitch point on movement planes of the circular spline and the flexspline are the pitch circle of the circular spline and the pitch circle of the flexspline under the engaging state respectively.

Three conjugate regions are formed between a tooth addendum of the circular spline and a tooth addendum of the flexspline, between the tooth addendum of the circular spline and a tooth dedendum of the flexspline, and between a tooth dedendum of the circular spline and the tooth addendum of the flexspline; wherein the tooth addendum of the circular spline and the tooth addendum of the flexspline, and the tooth addendum of the circular spline and the tooth dedendum of the flexspline are engaged simultaneously.

Compared with the prior art, the present disclosure has the following beneficial effects:

Since the conjugate cycloidal profiles are used as the profile of the circular spline and the profile of the flexspline under the engaging state, the harmonic reducer with the conjugate cycloidal profiles according to the present disclosure has the advantages of constant instantaneous transmission ratio, high contact ratio, high load and precision, no interference, low and constant relative sliding rate, no undercutting and the like. Compared with an existing harmonic reducer in which an undeformed profile of a flexspline is designed, so as to envelop a profile of a circular spline by fitting, profile parameters are fewer, parametrization design can be achieved, and theoretical design basis is available.

Figure 1:
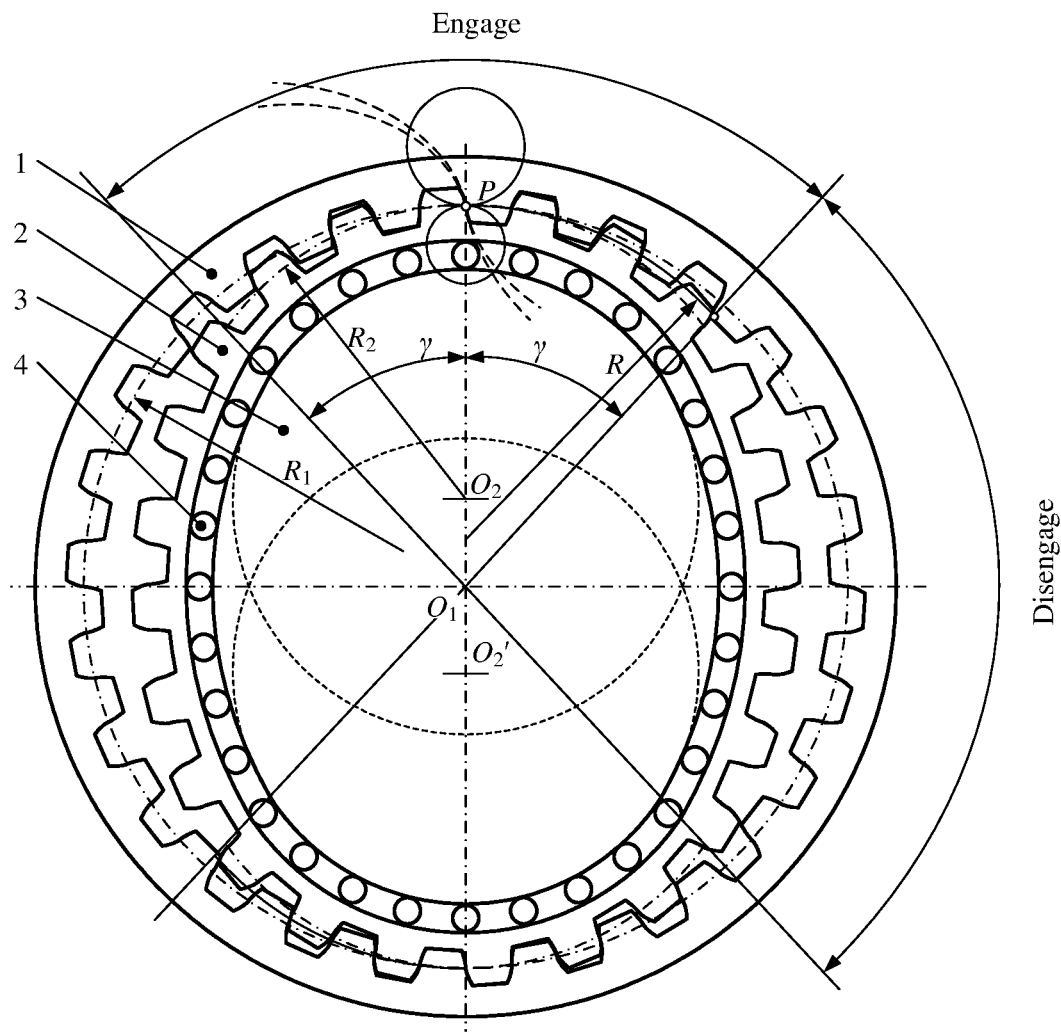
FIG. 1 is a schematic structural diagram of a harmonic reducer with conjugate cycloidal profiles according to the present disclosure.

In the drawings: 1: circular spline, 2: flexspline, 3: wave generator, and 4: flexible bearing.

DETAILED DESCRIPTION OF THE EMBODIMENTS

A design concept of the present disclosure is that a profile of a circular spline and a profile of a flexspline under an engaging state in a harmonic reducer are conjugate cycloidal profiles. The profile of the circular spline and the profile of the flexspline under the engaging state are formed by hypocycloids and epicycloids formed by two rolling circles pure rolling around a pitch circle of the circular spline and a pitch circle of the flexspline under the engaging state respectively, and a sum of radii of the two rolling circles is equal to a difference between radii of the pitch circle of the circular spline and the pitch circle of the flexspline under the engaging state; a wave generator of the harmonic reducer is a biarc cam wave generator, and a cam curve is an arc within an angle of contact in the long axis direction of the wave generator, the profile of the circular spline and the profile of the flexspline are conjugately engaged in the angle of contact, and the number of paired teeth with conjugate engagement can be determined due to the design of the curve of the angle of contact. According to the harmonic reducer with the conjugate cycloidal profiles designed in the present disclosure, three conjugate regions are formed between a tooth addendum of the circular spline and a tooth addendum of the flexspline, between the tooth addendum of the circular spline and a tooth dedendum of the flexspline, and between a tooth dedendum of the circular spline and the tooth addendum of the flexspline. Since the conjugate cycloidal profiles are used as the profile of the circular spline and the profile of the flexspline under the engaging state, the harmonic reducer with the conjugate cycloidal profiles according to the present disclosure has the advantages of constant instantaneous transmission ratio, wide range of engaged paired teeth, no interference, high load and precision, low and constant relative sliding rate, fewer parameters, easy to machine and the like.

The present application is further described in detail below with reference to the drawings and the embodiments, features and objectives of the present disclosure will become more obvious, and it should be understood that the specific embodiments described herein are merely for explaining the present disclosures, instead of limiting them. It should be noted that only parts related to the disclosure are shown in the drawings in order to facilitate the description. In addition, it should be noted that the embodiments in the present application and features in the embodiments may be mutually combined without conflicts.

As shown in FIG. 1, the present disclosure discloses a harmonic reducer with conjugate cycloidal profiles, including a circular spline 1, a flexspline 2, a wave generator 3 and a flexible bearing 4.

Figure 2:
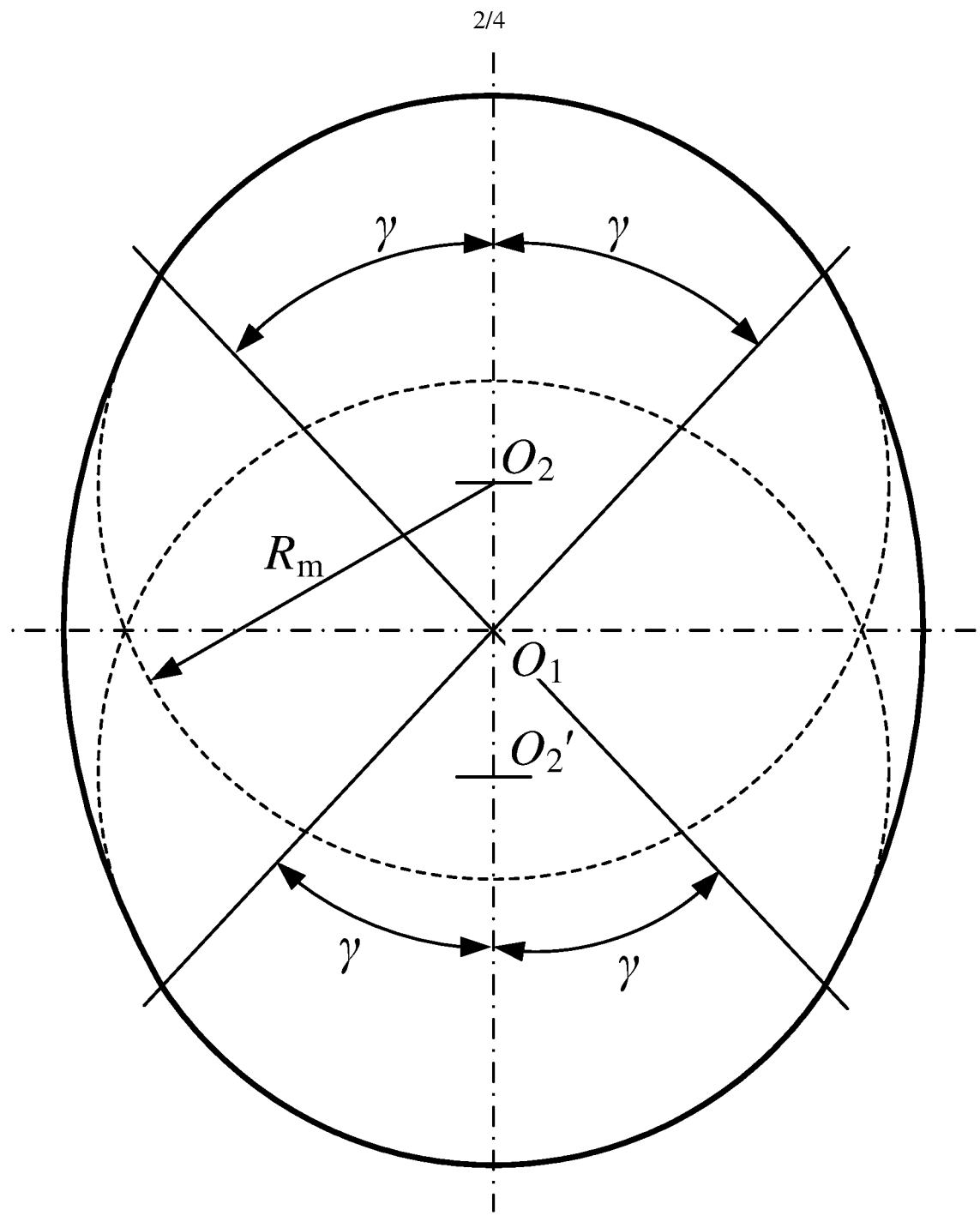
FIG. 2 is a schematic structural diagram of a wave generator shown in FIG. 1.

As shown in FIG. 2, the wave generator 3 is a biarc cam wave generator, and a cam curve of the biarc cam wave generator is two arcs respectively with $O_2$ and $O_2'$ as a center of a circle and $R_m$ as a radius within the range of 4 angles of contact (gamma) in the long axis direction of the wave generator.

As shown in FIG. 1, the flexible bearing 4 is installed between the wave generator 3 and the flexspline 2. The flexible bearing 4 and the flexspline 2 have certain flexibility, which are deformed under the action of the wave generator 3, and the deformed shape within the range of 4 angles of contact (gamma) in the long axis direction of the wave generator are arc shape.

Figure 3:
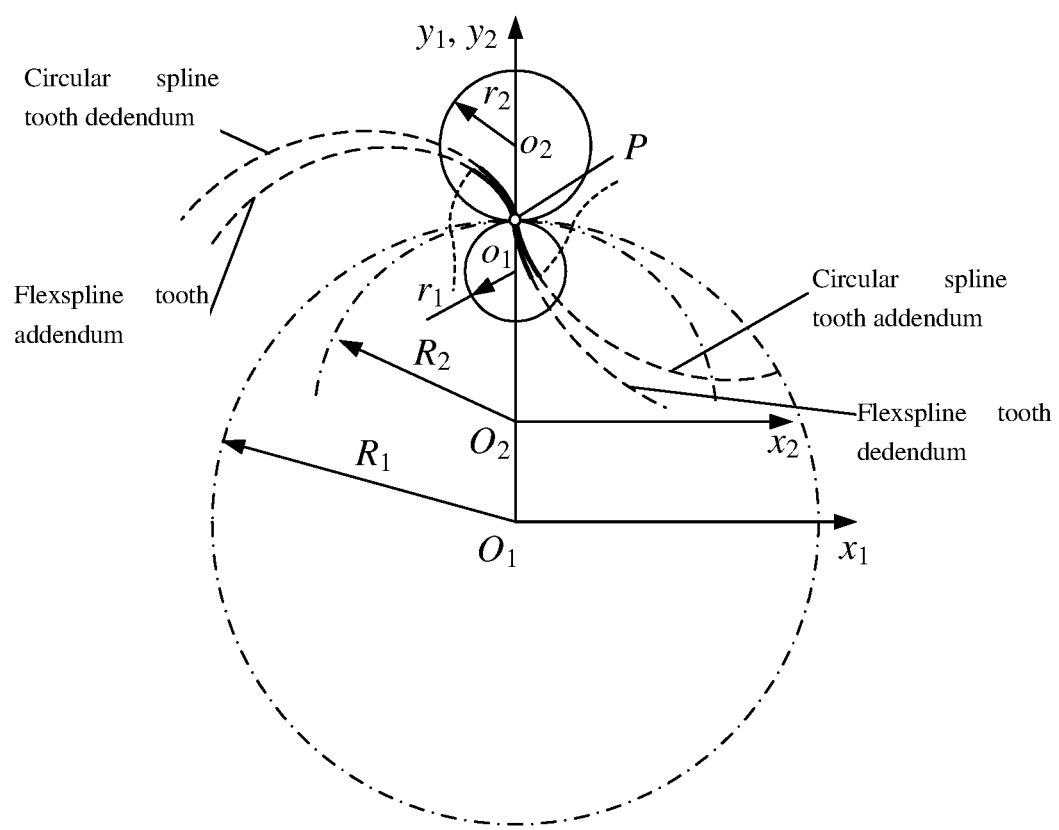
FIG. 3 is a schematic generation diagram of conjugate cycloidal profiles of the drive shown in FIG. 1.
Figure 4:
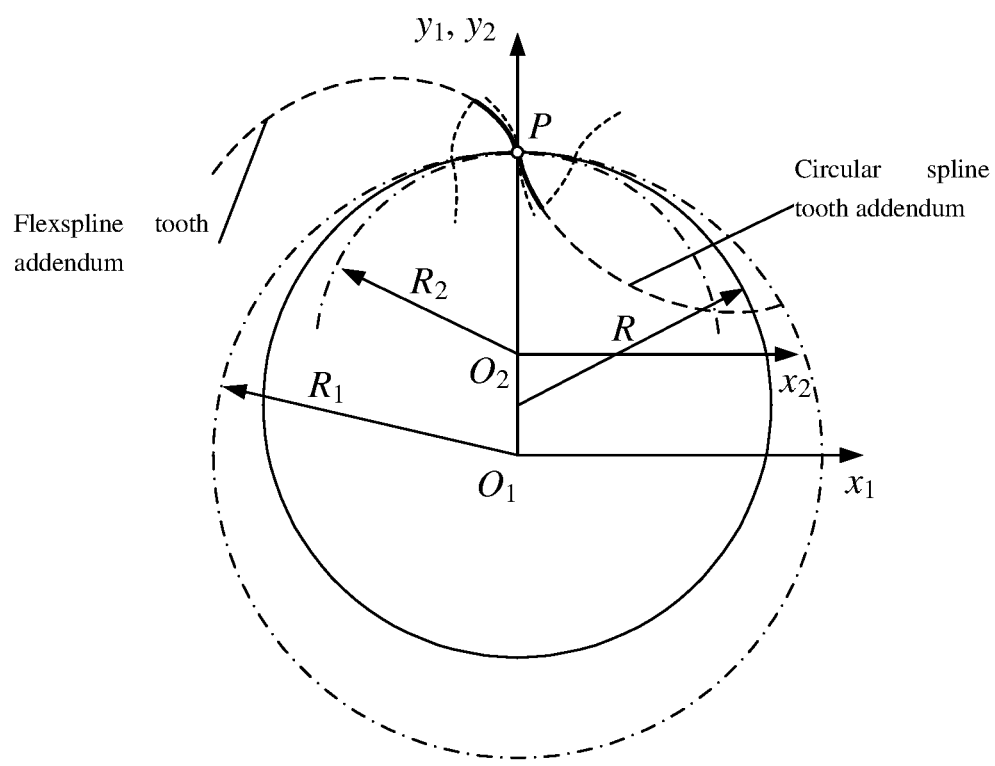
FIG. 4 shows a relationship between tooth addendums of the conjugate cycloidal profiles shown in FIG. 3.

As shown in FIG. 3, a profile of the circular spline 1 and a profile of the flexspline 2 under an engaging state are conjugate cycloidal profiles; the conjugate cycloidal profiles include tooth addendum profiles and tooth dedendum profiles, and are composed of hypocycloids and epicycloids formed by two rolling circles pure rolling around a pitch circle of the circular spline 1 and a pitch circle of the flexspline 2 under the engaging state respectively, wherein the tooth addendum profile of the circular spline 1 is the hypocycloid formed by the first rolling circle $o_1$, which is internally tangent to the pitch circle $O_1$ of the circular spline 1 at a point P, pure rolling around the pitch circle $O_1$ of the circular spline 1, and the tooth dedendum profile of the circular spline 1 is the epicycloid formed by the second rolling circle $o_2$, which is externally tangent to the pitch circle $O_1$ of the circular spline 1 at the point P, pure rolling around the pitch circle $O_1$ of the circular spline 1; and the tooth dedendum profile of the flexspline 2 is the hypocycloid formed by the first rolling circle $O_1$ pure rolling around the pitch circle $O_2$ of the flexspline 2 under the engaging state, and the tooth addendum profile of the flexspline 2 is the epicycloid formed by the second rolling circle $O_2$ pure rolling around the pitch circle $O_2$ of the flexspline 2 under the engaging state.

As shown in FIG. 1 to FIG. 4, a sum of radii of the first rolling circle $o_1$ and the second rolling circle $O_2$ is equal to a difference between radii of the pitch circle $O_1$ of the circular spline 1 and the pitch circle $O_2$ of the flexspline 2 under the engaging state, namely, $$r_1 + r_2 = R_1 - R_2$$

In the formula, $r_1$ is the radius of the first rolling circle, $r_2$ is the radius of the second rolling circle $O_2$, $R_1$ is the radius of the pitch circle of the circular spline, and $R_2$ is the radius of the pitch circle of the flexspline under the engaging state; and the tooth addendum profile of the circular spline and the tooth addendum profile of the flexspline are formed by the rolling circles with the radius of R pure rolling around the pitch circle $O_1$ of the circular spline and the pitch circle $O_2$ of the flexspline under the engaging state respectively based on an equivalent method for cycloid generation. Therefore, the tooth addendum profile of the circular spline and the tooth addendum profile of the flexspline are also mutually conjugate, thereby achieving complete conjugation of the profile of the circular spline 1 and the profile of the flexspline 2, increasing the number of paired teeth with conjugate engagement, and improving bearing capacity. Wherein, the radius R of the rolling circles meets:

$$R = R_1 - r_1 = R_2 + r_2$$

For example, a coordinate system $O_1$-$x_1y_1$ of the circular spline and a coordinate system $O_2$-$x_2y_2$ of the flexspline are established with $O_1$, $O_2$ as origins of coordinates, and connecting lines of $O_1$ and the point P, $O_2$ and the point P as an axis $y_1$ and an axis $y_2$, respectively. Equations of the conjugate cycloidal profiles under respective coordinate systems are $$\begin{cases} x_{\text{circular spline tooth addendum}} = R \sin\left(t - \frac{R}{R_1}t\right) - (R_1 - R) \sin\left(\frac{R}{R_1}t\right) \\ y_{\text{circular spline tooth addendum}} = R \cos\left(t - \frac{R}{R_1}t\right) + (R_1 - R) \cos\left(\frac{R}{R_1}t\right) \end{cases}$$

$$\begin{cases} x_{\text{flexspline tooth addendum}} = R \sin\left(t - \frac{R}{R_2}t\right) + (R - R_2) \sin\left(\frac{R}{R_2}t\right) \\ y_{\text{flexspline tooth addendum}} = R \cos\left(t - \frac{R}{R_2}t\right) - (R - R_2) \cos\left(\frac{R}{R_2}t\right) \end{cases}$$

$$\begin{cases} x_{\text{circular spline tooth dedendum}} = (R_1 + R - R_2) \sin\left(\frac{R_2 - R}{R_1}t\right) + \\ \qquad (R_2 - R) \sin\left(\frac{R_2 - R}{R_1}t - t\right) \\ y_{\text{circular spline tooth dedendum}} = (R_1 + R - R_2) \cos\left(\frac{R_2 - R}{R_1}t\right) + \\ \qquad (R_2 - R) \cos\left(\frac{R_2 - R}{R_1}t - t\right) \end{cases}$$

$$\begin{cases} x_{\text{flexspline tooth dedendum}} = (R_2 + R - R_1) \sin\left(\frac{R_1 - R}{R_2}t\right) + \\ \qquad (R_1 - R) \sin\left(\frac{R_1 - R}{R_2}t - t\right) \\ y_{\text{flexspline tooth dedendum}} = (R_2 + R - R_1) \cos\left(\frac{R_1 - R}{R_2}t\right) + \\ \qquad (R_1 - R) \cos\left(\frac{R_1 - R}{R_2}t - t\right) \end{cases}$$

Wherein, parameter t is a profile parameter, which corresponds to an angle at which the rolling circle rolls around the pitch circle.

According to the conjugate cycloidal profiles, three conjugate regions are formed between a tooth addendum of the circular spline 1 and a tooth addendum of the flexspline 2, between the tooth addendum of the circular spline 1 and a tooth dedendum of the flexspline 2, and between a tooth dedendum of the circular spline 1 and the tooth addendum of the flexspline 2. Wherein, the tooth addendum of the circular spline 1 and the tooth addendum of the flexspline 2, and the tooth addendum of the circular spline 1 and the tooth dedendum of the flexspline 2 are engaged simultaneously, with region coincidence, that is, there is two-point conjugation in the conjugate cycloidal profiles, thereby improving the bearing capacity.

The wave generator 3 and the flexible bearing 4 are arranged in the flexspline 2, and the flexspline 2 deforms under the action of the arc curves of the wave generator 3; and teeth of the flexspline 2 are distributed on the pitch circle of the flexspline 2 under the engaging state within the angle of contact in the long axis direction of the wave generator and engaged with teeth of the circular spline 1, and normal lines at any engaging points within the range of 4 angles of contact (gamma) in the long axis direction intersect at the pitch point P, that is, instantaneous transmission ratio of the conjugate cycloidal profiles is constant. Trajectories of the pitch point P on movement planes of the circular spline 1 and the flexspline 2 are the pitch circle $O_1$ of the circular spline 1 and the pitch circle $O_2$ of the flexspline 2 under the engaging state respectively. That is, the conjugate cycloidal profiles are in the engaging state within the range of 4 angles of contact (gamma) in the long axis direction of the wave generator and are in a disengaging state beyond the range of 4 angles of contact (gamma) in the long axis direction of the wave generator, as shown in FIG. 1. Therefore, engaged paired teeth of the harmonic drive with the conjugate cycloidal profiles can be increased by increasing the angle (gamma), thereby improving an contact ratio and bearing capacity.

The conjugate cycloidal profiles designed in the present disclosure have the characteristics of no interference in cycloids, low and constant relative sliding rate and no undercutting.

The above description is only the preferred embodiment of the present application and the explanation of the applied technical principles. It should be understood for those skilled in the art that the disclosure scope involved in the present application is not limited to the technical solutions made by specifically combining the above technical features, but also covers other technical solutions made by any combination of the above technical features or equivalent features thereof without departing from the concept of the present disclosure, such as technical solutions formed by mutually substituting the above features with (but not limited to) the technical features with similar functions disclosed in the present application.

What is claimed:

1. A harmonic reducer with conjugate cycloidal profiles, including a circular spline (1), a flexspline (2), a wave generator (3) and a flexible bearing (4); the flexible bearing (4) is installed between the wave generator (3) and the flexspline (2);

Wherein, a profile of the circular spline (1) and a profile of the flexspline (2) under an engaging state are conjugate cycloidal profiles, which are formed by tooth addendum profiles and tooth dedendum profiles respectively;

the tooth addendum profile of the circular spline (1) is a hypocycloid formed by a first rolling circle pure rolling around a pitch circle of the circular spline (1), and the tooth dedendum profile of the circular spline (1) is an epicycloid formed by a second rolling circle pure rolling around the pitch circle of the circular spline (1);

the tooth dedendum profile of the flexspline (2) is a hypocycloid formed by the first rolling circle pure rolling around a pitch circle of the flexspline (2) under the engaging state, and the tooth addendum profile of the flexspline (2) is an epicycloid formed by the second rolling circle pure rolling around the pitch circle of the flexspline (2) under the engaging state;

a sum of radii of the first rolling circle and the second rolling circle is equal to a difference between radii of the pitch circle of the circular spline and the pitch circle of the flexspline under the engaging state, so as to achieve complete conjugation of the profile of the circular spline (1) and the profile of the flexspline (2), increase the number of paired teeth with conjugate engagement, and improve bearing capacity; equations of the conjugate cycloidal profiles under respective coordinate systems are $$\begin{cases} x_{circular\ spline\ tooth\ addendum} = R\sin\left(t-\frac{R}{R_1}t\right) - (R_1-R)\sin\left(\frac{R}{R_1}t\right) \\ y_{circular\ spline\ tooth\ addendum} = R\cos\left(t-\frac{R}{R_1}t\right) + (R_1-R)\cos\left(\frac{R}{R_1}t\right) \end{cases}$$

$$\begin{cases} x_{flexspline\ tooth\ addendum} = R\sin\left(t-\frac{R}{R_2}t\right) + (R-R_2)\sin\left(\frac{R}{R_2}t\right) \\ y_{flexspline\ tooth\ addendum} = R\cos\left(t-\frac{R}{R_2}t\right) - (R-R_2)\cos\left(\frac{R}{R_2}t\right) \end{cases}$$

$$\begin{cases} x_{circular\ spline\ tooth\ dedendum} = (R_1+R-R_2)\sin\left(\frac{R_2-R}{R_1}t\right) + \\ \qquad (R_2-R)\sin\left(\frac{R_2-R}{R_1}t-t\right) \\ y_{circular\ spline\ tooth\ dedendum} = (R_1+R-R_2)\cos\left(\frac{R_2-R}{R_1}t\right) + \\ \qquad (R_2-R)\cos\left(\frac{R_2-R}{R_1}t-t\right) \end{cases}$$

$$\begin{cases} x_{flexspline\ tooth\ dedendum} = (R_2+R-R_1)\sin\left(\frac{R_1-R}{R_2}t\right) + \\ \qquad (R_1-R)\sin\left(\frac{R_1-R}{R_2}t-t\right) \\ y_{flexspline\ tooth\ dedendum} = (R_2+R-R_1)\cos\left(\frac{R_1-R}{R_2}t\right) + \\ \qquad (R_1-R)\cos\left(\frac{R_1-R}{R_2}t-t\right) \end{cases}$$

in the formulae, parameters are defined based on a coordinate system $O_1$-$x_1y_1$ of the circular spline and a coordinate system $O_2$-$x_2y_2$ of the flexspline, which are established with $O_1$, $O_2$ as origins of coordinates, and connecting lines of $O_1$ and the point P, $O_2$ and the point P as an axis $y_1$ and an axis $y_2$, respectively; wherein, $R_1$ is the radius of the pitch circle of the circular spline, and $R_2$ is the radius of the pitch circle of the flexspline under the engaging state; the radius R of the rolling circles meets: $R=R_1-r_1=R_2+r_2$;

and parameter t is a profile parameter, which corresponds to an angle at which the rolling circle rolls around the pitch circle; and the wave generator (3) is a biarc cam wave generator, and a cam curve of the biarc cam wave generator is an arc within an angle of contact in the long axis direction of the wave generator.

2. The harmonic reducer with conjugate cycloidal profiles according to claim 1, wherein the wave generator (3) and the flexible bearing (4) are arranged in the flexspline (2), and the flexspline (2) deforms under the action of arc curves of the wave generator (3); and within the angle of contact in the long axis direction of the wave generator, teeth of the flexspline are distributed on the pitch circle of the flexspline (2) under the engaging state and engaged with teeth of the circular spline (1), and normal lines at any engaging points within the angle of contact in the long axis direction intersect at a pitch point.

3. The harmonic reducer with conjugate cycloidal profiles according to claim 2, wherein, trajectories of the pitch point on movement planes of the circular spline (1) and the flexspline (2) are the pitch circle of the circular spline (1) and the pitch circle of the flexspline (2) under the engaging state respectively.

4. The harmonic reducer with conjugate cycloidal profiles according to claim 1, wherein, three conjugate regions are formed between a tooth addendum of the circular spline (1) and a tooth addendum of the flexspline (2), between the tooth addendum of the circular spline (1) and a tooth dedendum of the flexspline (2), and between a tooth dedendum of the circular spline (1) and the tooth addendum of the flexspline (2); wherein the tooth addendum of the circular spline (1) and the tooth addendum of the flexspline (2), and the tooth addendum of the circular spline (1) and the tooth dedendum of the flexspline (2) are engaged simultaneously.

\* \* \* \* \*